US008010605B2

(12) United States Patent
Chang

(10) Patent No.: US 8,010,605 B2
(45) Date of Patent: Aug. 30, 2011

(54) SYSTEM AND METHOD FOR SHARING INFORMATION AMONG PROVIDER SYSTEMS

(75) Inventor: Kae-por F. Chang, Newton Highlands, MA (US)

(73) Assignee: Imagitas, Inc., Waltham, MA (US)

( * ) Notice: Subject to any disclaimer, the term of this patent is extended or adjusted under 35 U.S.C. 154(b) by 1067 days.

(21) Appl. No.: 10/470,641

(22) Filed: Jul. 29, 2003

(65) Prior Publication Data

US 2006/0041618 A1    Feb. 23, 2006

Related U.S. Application Data

(63) Continuation-in-part of application No. 09/929,519, filed on Aug. 14, 2001, now Pat. No. 7,165,092.

(51) Int. Cl.
*G06F 15/16* (2006.01)
(52) U.S. Cl. .......... 709/205; 709/203; 709/204; 705/75; 707/E17.102
(58) Field of Classification Search .................. 709/215, 709/228, 242, 244, 203–205; 707/10, 203, 707/204, E17.102; 704/270.1; 705/26, 75
See application file for complete search history.

(56) References Cited

U.S. PATENT DOCUMENTS

| 6,434,619 | B1 * | 8/2002 | Lim et al. ...................... 709/229 |
| 6,571,279 | B1 * | 5/2003 | Herz et al. ..................... 709/217 |
| 6,853,987 | B1 * | 2/2005 | Cook ............................. 705/75 |
| 6,925,631 | B2 * | 8/2005 | Golden ......................... 717/115 |
| 7,082,418 | B2 * | 7/2006 | Levy et al. ...................... 706/12 |
| 7,181,412 | B1 * | 2/2007 | Fulgoni et al. .................. 705/10 |
| 7,215,887 | B2 * | 5/2007 | Ternullo et al. ............... 398/118 |
| 7,225,222 | B1 * | 5/2007 | Lu ................................. 709/203 |
| 7,249,060 | B2 * | 7/2007 | Ling ............................. 705/26 |
| 7,359,871 | B1 * | 4/2008 | Paasche et al. ................. 705/26 |
| 7,454,356 | B2 * | 11/2008 | Fields et al. ..................... 705/1 |
| 2002/0032721 | A1 * | 3/2002 | Chang .......................... 709/202 |
| 2002/0032791 | A1 * | 3/2002 | Isherwood et al. ........... 709/230 |
| 2002/0069093 | A1 * | 6/2002 | Stanfield ........................ 705/5 |
| 2002/0072937 | A1 * | 6/2002 | Domenick et al. .............. 705/5 |
| 2002/0133412 | A1 * | 9/2002 | Oliver et al. ................... 705/26 |
| 2002/0178088 | A1 * | 11/2002 | Lurie et al. ..................... 705/26 |
| 2003/0023957 | A1 * | 1/2003 | Bau et al. ...................... 717/140 |
| 2003/0083948 | A1 * | 5/2003 | Rodriguez et al. ............. 705/26 |
| 2003/0088639 | A1 * | 5/2003 | Lentini et al. ................. 709/217 |
| 2003/0135512 | A1 * | 7/2003 | Morgan et al. ................ 707/102 |
| 2003/0149781 | A1 * | 8/2003 | Yared et al. ................... 709/229 |
| 2005/0138554 | A1 * | 6/2005 | Bell et al. ...................... 715/530 |
| 2005/0198086 | A1 * | 9/2005 | Moore et al. .................. 707/204 |
| 2006/0041841 | A1 * | 2/2006 | Parasu .......................... 715/513 |

\* cited by examiner

*Primary Examiner* — Alina N. Boutah
(74) *Attorney, Agent, or Firm* — George M. Macdonald; Charles R. Malandra, Jr.; Steven J. Shapiro

(57) ABSTRACT

A system is provided wherein information is provided once, and that information is provided to multiple provider systems. Information provided by a user is stored and implemented for each provider as needed. The information is provided by a user to a central server that distributes the information to one or more provider systems. In particular, the information is stored in a database and distributed to the provider system depending on the type of transaction. According to one aspect, the information is stored in an unstructured format in the database. In some embodiments the information contains metatags or indicators that can be parsed by a parser to extract the data content from the desired data fields.

9 Claims, 21 Drawing Sheets

Get help with all your moving needs – Online!

| Home | Change of Address | Shopping | Info Center | USPS.com | Privacy | About Us | Help |

Change your address online with the U. S. Postal Service — 801

Please complete all of the following information. If you need help, please click the help link for instructions.

WHO is Moving?:
⦿ Individual  ◯ Family  ◯ Business (HELP) — 802

Date to BEGIN forwarding mail:         Date to STOP forwarding mail:
[November ▼] [18 ▼] [1999 ▼] (HELP)   [January ▼] [1 ▼] [2000 ▼] (HELP)
— 802

First Name:      Last Name:              Middle Name (or Initial):
[Jo]             [Smith]                 [F]
(HELP)           (HELP)                  (HELP)
— 802

Please verify if all of the above information is correct, then click the "Continue" button below.

[Continue] — 804

Home | Change of Address

Change your address online with the U. S. Postal Service — 1001

Please check all of the following information for accuracy. If you need to make changes, please use the browser "Back" button. Otherwise, click "Continue".

Who is Moving?:
INDIVIDUAL

| First Name:<br>Jo | Last Name:<br>Smith | Middle Name/Initial:<br>F |
|---|---|---|
| Date to begin forwarding mail:<br>November 18, 1999 | | Date to stop forwarding mail:<br>January 1, 2000 |
| Old Address | | New Address |
| Street Address:<br>120 Orlando Ave | | Street Address:<br>1 Symphony Rd |
| City:<br>Oreland | State:<br>PA | City:<br>Boston | State:<br>MA |
| ZIP Code:<br>19075 | | ZIP Code:<br>02115 |

Continue — 1004

Home | Change of Address

*FIG. 10*

*MoversGuide*.com  [Home] [Change of Address] [Shopping] [Info Center] [USPS.com] [Privacy] [About Us] [Help]

Get help with all your moving needs – Online!

Create your customized moving checklist ←—1101

Please complete all of the following information and MoversGuide will create a checklist of things to do before, during, and after your move.

1. Are you moving yourself?  ◯ Yes  ◯ No
2. Are you moving with children?  ◯ Yes  ◯ No
3. Are you moving with pets?  ◯ Yes  ◯ No
4. Are you moving to a different state?  ◯ Yes  ◯ No
5. Are you buying a home?  ◯ Yes  ◯ No
6. Will you be renting a truck?  ◯ Yes  ◯ No
7. Will your move be part of a corporate relocation?  ● Yes  ◯ No

[Create Checklist]

Home | Moving Checklist

*FIG. 11*

*MoversGuide*.com

Get help with all your moving needs – Online!

| Home | Change of Address | Shopping | Info Center | USPS.com | Privacy | About Us | Help |

→ 1201

CommunityCENTER
Find Community Information Online

Boston, Massachusetts

The world knows Boston for Brahminism and baked beans; creme pie and cod; Revers's ride, and that splash of tea in 1773. Locals know the "the Hub" for its unnavigable cart paths, loony drivers and love-hate relationship with the Red Sox.

Attitude, history and style run rampant on this city's cobblestoned streets, where the gridlocked masses go to creative extremes just to "pahk their cahs". Ah, the Boston Accent—defined by top linguists as "one-third Harvard, one-third hick and one-third mick". (Visitors: Consult the Wicked Good Guide to Boston English for help ordering a grinder and a frappe at the spa.)

From the tony shops of Newbury Street to the North End espresso huts, each Boston neighborhood impresses its own distinctive charm. And an hour drive in any direction produces a choice view of beach, forest or mountain.

Olde as Boston's soul may be, it is spry on the surface. With more than 60 colleges and universities, the beantown claims the highest student population in the U.S. That coupled with its forefront status in the biotech industry guarantees—and delivers—a population of sheer brainiacs.

So when you roll in to town with your normal accent and ask a native, " Where can I get scrod around here?"; don't be surprised if the response is something like, "How delightful to hear the pluperfect subjunctive."

Home I Community Center I Boston, MA

*FIG. 12*

*MoversGuide*.com

[Home] [Change of Address] [Shopping] [Info Center] [USPS.com] [Privacy] [About Us] [Help]

Get help with all your moving needs – Online!

CommunicationsCENTER ⟵ 1301

You have chosen Cable Service.

Would you like to: ⟵ 1302

◉ Connect
○ Disconnect
○ Connect and Disconnect

[Continue] ⟵ 1304

Home | Cable

FIG. 13

MoversGuide.com

[Home] [Change of Address] [Shopping] [Info Center] [USPS.com] [Privacy] [About Us] [Help]

Get help with all your moving needs — Online!

CommunicationsCENTER ← 1401

To see the Cable Providers that service your new home, please input your new home address.

Note: * indicates a required field

*Street Address:
[156 Oak St _____] ← 1402

*State:  *ZIP:
[MA]    [02464] ← 1402

*City:
[Newton]

[Continue] ← 1404

Home | Cable

FIG. 14

*MoversGuide*.com  Get help with all your moving needs – Online!

[Home] [Change of Address] [Shopping] [Info Center] [USPS.com] [Privacy] [About Us] [Help]

CommunicationsCENTER

Search Location: 156 Oak St. Newton, MA 02464          Change My Location

These are the cable providers who offer services in your area. Please select the provider and services you would like to learn more about.

| PROVIDER 1 ——1506 / 1510 | PROVIDER 2 ——1512 / 1508 |
|---|---|
| Show Me:<br>⦿ Cable Only<br>○ Cable, plus other savings on communications! | Show Me:<br>○ Cable Only<br>○ Cable, plus other savings on communications! |

[Continue] ——1504

Home | Cable

*FIG. 15*

*MoversGuide*.com | Home | Change of Address | Shopping | Info Center | USPS.com | Privacy | About Us | Help Get help with all your moving needs – Online!

CommunicationsCENTER

Search Location: 156 Oak St. Newton, MA 02464     Change My Location ←— *1601*

Cable by AT&T —*1602*

☐ Total Communications Bundle     Price: $49.95

For the first time, you can get everything you need from one place. Sign up now to enjoy 33% savings on all your communications needs.

More Information —*1602*     Channel Lineup

☐ One Rate Bundle     $69.99

Some of our providers offer bundles which provide special savings on combinations of communication services..We will automatically show you the bundles available in your area given your selection above.

More Information —*1602*     Channel Lineup

☐ Optimum Service     Price: $00.00

Some of our providers offer bundles which provide special savings on combinations of communication services..We will automatically show you the bundles available in your area given your selection above.

More Information —*1602*     Channel Lineup

☐ Optimum Plus Service     Price: $00.00

Some of our providers offer bundles which provide special savings on combinations of communication services..We will automatically show you the bundles available in your area given your selection above.

More Information     Channel Lineup

[ Continue ]—*1604*

Home | Cable

| Service Provider Check-Out Table (A400) | |
|---|---|
| Serv. Prov. ID (A410) | Object (A412) |
| 1 | 1 |
| 1 | 2 |
| 1 | 5 |
| 1 | 7 |
| 2 | 1 |
| 2 | 3 |
| 3 | 2 |
| ⋮ | ⋮ |

Customer Check-Out Table A514

| Cust. ID A512 | Serv. Prov. ID A522 | Object ID A524 | Content |
|---|---|---|---|
| 1001 | 1 | 1 | <Name><Title>...</Title><br><Fname>...</Fname><br><Lname>...</Lname></Name> |
| 1001 | 1 | 2 | ⋮ |
| 1001 | 1 | 5 | ⋮ |
| 1001 | 1 | 7 A527 (u) | ⋮ |
| 1001 | 2 | 1 | ⋮ |
| 1001 | 2 | 3 | ⋮ |
| 1001 | 3 | 2 | ⋮ |
| ... | ... | ... | ... |
| 1002 | ⋮ | ⋮ | ... |

FIG. 21

SYSTEM AND METHOD FOR SHARING INFORMATION AMONG PROVIDER SYSTEMS

RELATED APPLICATIONS

This application is a continuation-in part of U.S. Ser. No. 09/929,519, filed Aug. 14, 2001, now U.S. Pat. No. 7,165,092, entitled, "System And Method For Sharing Information Among Provider Systems," and now pending.

TECHNICAL FIELD

The invention relates generally to application programming, and more specifically, to storing user information in a central server that distributes the information to provider systems.

BACKGROUND

Transactions using public and private networks have become commonplace. A transaction is generally performed by entities known as providers and consumers. A provider is generally an entity, such as a computer system that provides one or more products or services to consumers. A consumer may also be a computer system, operated by a user who is the consumer of such goods or services. These transactions may be, for example, a personal transaction such as buying a product or service over the Internet, or may be a business-to-business transaction performed over one or more public or private networks. These providers and consumers typically connect to the network and conduct transactions by sending and receiving messages using a communication protocol, such as the well-known TCP/IP communication protocol.

Consumers currently conduct transactions over networks such as the Internet. These transactions are commonly referred to as electronic commerce transactions, also known as "e-business" or "e-commerce transactions." Individual entities, such as companies, commonly use the Internet to conduct regular business transactions, including advertising their products to customers and processing transactions. Transaction information is generally stored at the company location or on the company system. If the person chooses to conduct business with another company, that person is generally required to enter his or her information with that company as well.

Transactions are typically performed using an application referred to as a browser, such as the Microsoft Explorer or Netscape Navigator browsers. A browser communicates to users through HTTP servers (or "Web servers") using the well-known HTTP transfer protocol. In this case, a browser displays an interface provided by the HTTP server, and the user provides information, such as identification information (name, address, phone, etc.), financial information (credit card number, expiration, name, etc.), or other information to conduct a transaction. The interface may be, for example, an HTML interface as known in the art, and the user may enter information into one or more fields of an HTML page. This information is then transferred to the server, wherein the information is processed and/or stored by a program executing at the server. The program may be, for example, a script, executable, or other type of program written in one or more programming languages, such as JavaScript, Java, Perl, cgi scripts, or the like. The information may be stored in a database, such as a relational, object, file system or other type of database known in the art. Other methods for transferring information between a server and client may be used, such as by implementing remote objects using Common Object Request Broker Architecture (CORBA), among others.

In general, computer systems that function as providers are commonly referred to as "hosts" or "servers," and systems that function as consumers are referred to as "clients." Client-server systems are well-known in the art, and form the basis for conducting transactions over the Internet. Servers generally receive transaction requests from clients and store information relating to those transactions. Server transaction functions are generally limited to the businesses that they support. For example, the site www.bn.com operated by Barnes and Noble bookstores includes servers that perform purchasing transactions with respect to purchasing media such as books, CDs, DVDs, and the like. Such servers generally allow a user to order and review transaction information associated with the transactions supported.

SUMMARY

Conventional systems are deficient in that information needed to support transactions needs to be re-entered by a user each time the user accesses a different provider system. That is, users, through computer system interfaces enter the same or similar information into multiple systems. This additional data entry becomes problematic as the number of providers to support a single event is numerous. For example, when reserving a trip online, a user may need to access a plane reservation system, car rental system, hotel reservation system, restaurant guide, among other systems to support the trip. As each of these provider systems is accessed, the same or similar information needs to be entered, creating additional effort for the user.

According to one aspect of the invention, a system is provided wherein information is provided once, and that information is provided to multiple provider systems. According to one embodiment of the invention, information provided by a user is stored and implemented for each provider as needed. In one embodiment, the information is provided by a user to a central server that distributes the information to one or more provider systems. In particular, the information is stored in a database and distributed to the provider system depending on the type of transaction.

According to another aspect, a subset of the information is operated on as a group, and this subset is provided by a user on that basis. Because information is operated on as a group, related information may be easily transferred from the system to a provider. Also, graphical user interfaces may be adapted that may be reused for different providers, and programming costs are reduced.

According to another aspect, multiple groups of similar information associated with a user may be stored. For example, if the event is a move from one location to another, addresses of each location may be stored and accessed as needed. Also, information for a number of credit or debit cards may be stored and used as needed. Further, predefined knowledge regarding the event may be used to translate the stored information into fields for one or more provider systems. For instance, if a user living in one town moves to another town, the system may be operable to order the correct services in either the first town or the second. In particular, appropriate utility connection or disconnection requests may be issued to the providers of utilities associated with the first and second towns.

According to another aspect of the invention, a convenient information display is provided wherein information is acted on as a group. A key field may be used to manipulate the data as a group. For instance, multiple addresses of a user may be stored and displayed by a key field. For example, the system may display as a key field, the town of each address. The user may, through the interface, select a key field, selecting the entire group. This group of information, for example, may be automatically populated to fields in an entry interface, or automatically be selected as configuration information to support a transaction. Multiple fields are acted on as a group related by the key field. In another aspect of the invention, queries for information are arranged in question groups—such as those related to billing, shipping, personal or other information, and displayed to a user in general entry interface. By creating general entry interfaces, specific entry interfaces do not need to be created for different providers, and interface programming costs are reduced.

Also, graphical user interfaces may be adapted that may be reused for different providers, and programming costs are reduced. Further, multiple groups of similar information associated with a user may be stored. For example, if the event is a move from one location to another, addresses of each location may be stored and accessed as needed. Also, information for a number of credit or debit cards may be stored and used as needed. Further, predefined knowledge regarding the event may be used to translate the stored information into fields for the provider system. Further, a convenient information display is provided wherein information is acted on as a group. A key field may be used to manipulate the data as a group. For instance, multiple addresses of a user may be stored and displayed by a key field. For example, the system may display as a key field, the town of each address. The user may, through the interface, select a key field, selecting the entire group. This group of information, for example, may be automatically populated to fields in an entry interface, or automatically be selected as configuration information to support a transaction. Multiple fields are acted on as a group related by the key field. In another aspect of the invention, queries for information are arranged in question groups—such as those related to billing, shipping, personal or other information, and displayed to a user in general entry interface. By creating general entry interfaces, specific entry interfaces do not need to be created for different providers, and interface programming costs are reduced.

One embodiment is directed to a method for providing services by a service provider to a customer, comprising providing to the customer a list of service providers or services; receiving from the customer an identifier of the service provider with which the customer wishes to transact; receiving from the customer a plurality of customer data objects corresponding to check-out data objects used by the service provider to provide services; placing the customer data objects into a check-out data construct comprising information identifying the customer, information identifying the service provider, customer data corresponding to the data objects and tag information identifying the customer data; and providing the service provider with the check-out data objects used by the service provider to provide services.

Another embodiment is directed to a system for sharing customer data with a service provider, comprising a database in which a plurality of customer data objects are stored, each customer data object including content and tags indicative of the content; a tag parser that parses the tags to determine the content of the customer data objects; an information manager operable to provide the data object content to the service provider to allow the service provider to provide services to the customer.

Other advantages, novel features, and objects of the invention will become apparent from the following detailed description of the invention when considered in conjunction with the accompanying drawings. In the Figures, each identical, or substantially similar component that is illustrated in various Figures is represented by a single numeral or notation. For purposes of clarity, not every component is labeled in every Figure, nor is every component of each embodiment of the invention shown where illustration is not necessary to allow those of ordinary skill in the art to understand the invention.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings:

FIG. 8 is a web page presented in accordance with one embodiment of the invention;

FIG. 9 is a web page presented in accordance with one embodiment of the invention;

FIG. 10 is a web page presented in accordance with one embodiment of the invention;

FIG. 11 is a web page presented in accordance with one embodiment of the invention;

FIG. 12 is a web page presented in accordance with one embodiment of the invention;

FIG. 13 is a web page presented in accordance with one embodiment of the invention;

FIG. 14 is a web page presented in accordance with one embodiment of the invention;

FIG. 15 is a web page presented in accordance with one embodiment of the invention;

FIG. 16 is a web page presented in accordance with one embodiment of the invention;

FIG. 20 shows a service provider checkout table according to one embodiment of the invention; and FIG. 21 shows a customer checkout table according to one embodiment of the invention.

DETAILED DESCRIPTION

The present invention will be more completely understood through the following detailed description which should be read in conjunction with the attached drawings in which similar reference numbers indicate similar structures. All references cited herein are hereby expressly incorporated by reference.

This application is a continuation-in part of U.S. Ser. No. 09/929,519, filed Aug. 14, 2002, entitled, "System And Method For Sharing Information Among Provider Systems," and now pending.

It should be understood that e-commerce transactions may be performed between any entities, whether they are individuals or companies. The term "company" will be used synonymously with "provider" or "individual" providing goods or services; the company, provider or individual may be any entity providing goods or services. The terms "customers" "consumer," "person," and "user" will also be used interchangeably as an entity that shops for, purchases and/or receives goods or services. The term "online" refers to a transaction or communication in a computer network environment such as the world wide web.

Also, it should be understood that questions that are common among providers to a service or a product are referred to as service-specific or product-specific questions. Related service-specific or product-specific questions can also comprise a service checkout object. Questions that are not common among providers to a product or service are referred to as provider-specific questions. Related provider-specific questions can also comprise a service checkout object.

Figure 1:
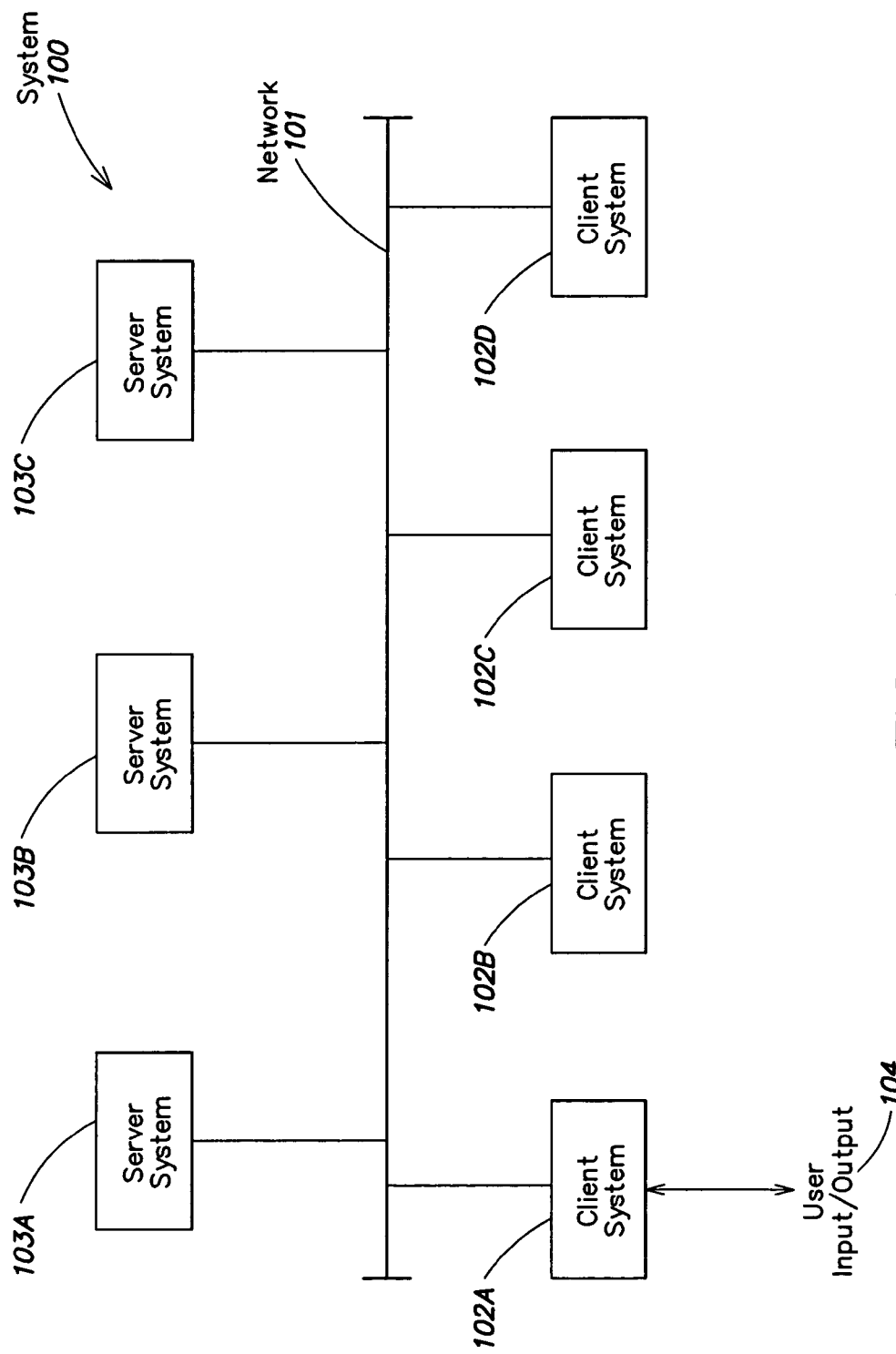
FIG. 1 is a block diagram of an environment suitable for performing various aspects of the invention.

FIG. 1 shows a system suitable for implementing various embodiments of the present invention. One or more client systems 102A-102D communicate with one or more server systems 103A-103C for the purposes of exchanging information and performing transactions. These systems 102, 103 communicate using a communication protocol such as TCP/IP over network 101. Server 103 may be, for example, an HTTP server that is configured to perform transactions. These servers 103 may accept and store information received from a user 102. In particular, a user 102 may provide and receive, respectively, input/output 104 through an interface of a client system 102. The information is transferred over network 101 and stored at one or more servers 103 using one or more communication protocols, such as TCP/IP and one or more transfer protocols such as HTTP. Other protocols are available as known to those of skill in the art.

The communication network 101 may be an ETHERNET network, Fast ETHERNET or other type of local or wide area network (LAN or WAN), a point-to-point network provided by telephone services, or other type of communication network or combination of networks thereof as known to those of skill in the art. Information consumers and providers, also referred to in the art as client and server systems 102, 103, respectively, communicate through the network 101 to exchange information.

Figure 2:
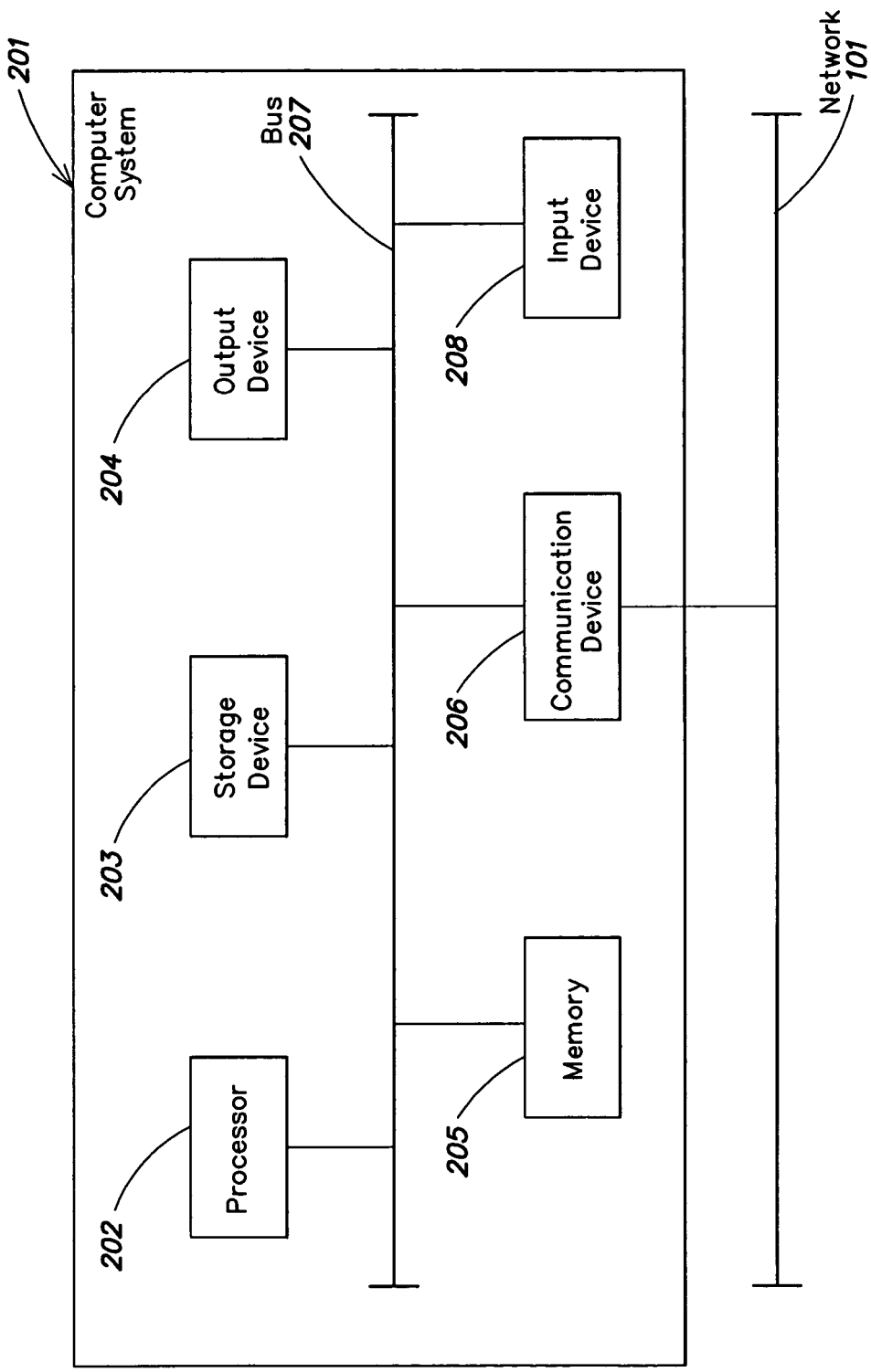
FIG. 2 is a block diagram of a general purpose computer system.

Computer systems 102, 103 may be general purpose computer systems 201 such as that shown in FIG. 2. The computer system 201 may include a processor 202 connected to one or more storage devices 203, such as a disk drive, through a communication device such as bus 207. The computer system 201 also includes one or more output devices 204, such as a monitor or graphic display or a printing device, and one or more input devices 207, such as a keyboard, mouse or other device. The computer system 201 typically includes a memory 205 for storing programs and data during operation of the computer system 201. In addition, the computer system 201 may contain one or more communication devices 206 that connects the computer system 201 to a communication network 101.

Computer system 201 may be a general purpose computer system that is programmable using a high level computer programming language. The computer system 201 may also be implemented using specially programmed, special purpose hardware. In computer system 201, the processor 202 is typically a commercially available processor, such as the PENTIUM, PENTIUM II, PENTIUM III, PENTIUM IV or StrongARM microprocessor from the Intel Corporation, PowerPC microprocessor, SPARC processor available from Sun Microsystems, or 68000 series microprocessor available from Motorola. Many other processors may be used, and the invention is not limited to any particular type.

Such a processor 202 usually executes an operating system which may be, for example, DOS, WINDOWS 95, WINDOWS NT, WINDOWS 2000, or WinCE available from the Microsoft Corporation, MAC OS SYSTEM 7 available from Apple Computer, SOLARIS available from Sun Microsystems, NetWare available from Novell Incorporated, PalmOS available from the 3COM corporation, or Linux or other UNIX-based operating systems available from various sources. Many other operating systems may be used, and the invention is not limited to any particular operating system.

It should be appreciated that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

Figure 3:
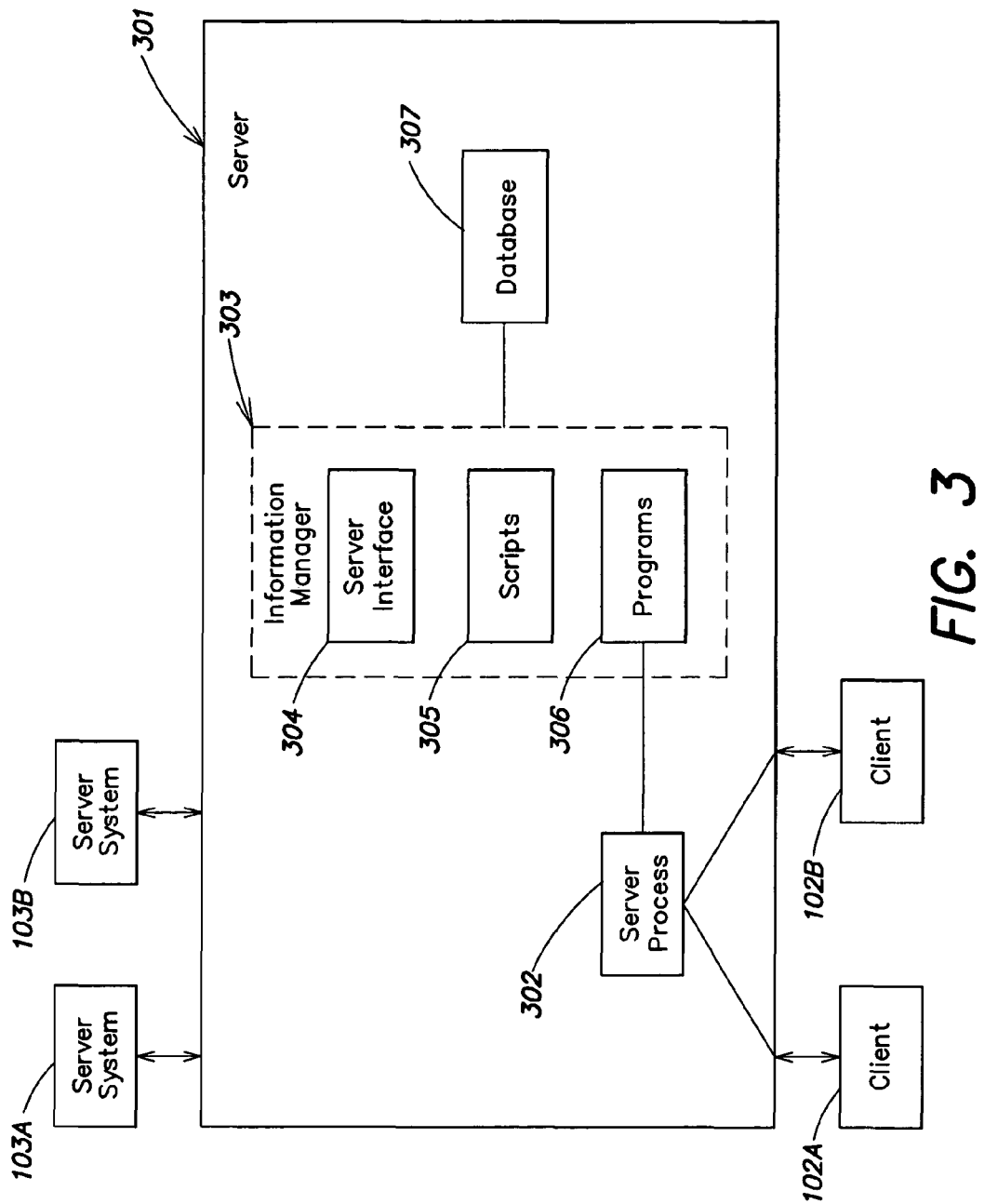
FIG. 3 is a block diagram of a system for managing information among a plurality of systems according to one embodiment of the invention.

FIG. 3 shows a block diagram of a system for managing information among a plurality of provider systems 103 according to one embodiment of the invention. Intermediate server 301, upon which various aspects of the invention may be implemented, may be, for example, a general purpose computer system as described above with reference to FIG. 2. Server 301, which may reside at a company or other organization (e.g., the United States Postal Office), collects information provided by one or more clients 102 and provides this information to one or more provider systems 103. Information received from clients 102 is stored in database 307 and is provided to server 103, depending on the type of transaction. Information involved in transactions may be securely transmitted between servers 103 and clients 102. For instance, Secure Socket Layer (SSL) encryption may be used to protect information collected by server 301.

Server 301 includes an information manager 303 to perform management of information received from clients 102. Manager 303 may comprise one or more executable programs 306 or scripts 305 written in one or more programming languages. These programs and scripts are operable to handle requests, receive and process information, generate interfaces, and to store data in database 307. Server interface 304 is operable to broker information to one or more provider systems 103, and may be programmed in one or more programming languages, such as Java. Server interface 304 is also operable to perform one or more transactions on behalf of its users 102. Transactions may be performed electronically, such as by email, XML, or Electronic Data Interchange (EDI), or may be converted to alternative forms, such as fax and forms that are hand-processed. Other methods for transferring information and supporting transactions may also be used.

According to one embodiment of the invention, server 301 distributes information related to a single event to multiple providers 103 of goods and/or services. This single event may comprise many smaller transactions, of which, multiple provider systems 103 must be accessed.

For example, the event may be an event such as a wedding, and server 301 may maintain information related to weddings. Server 301 could allow a user 102 to perform one or more transactions with providers 103 of goods and services associated with weddings, and perform other wedding-related functions.

According to one aspect, server 301 maintains a mapping of data fields of provider systems 103 to a common field stored in database 307. Database 307 may be, for example, a relational database system such as Oracle, Access, or another database that is executed on server 301 or anther system. Server 301 may collect information, for example, using standard input interfaces that are common to one or more providers 103.

Figure 4:
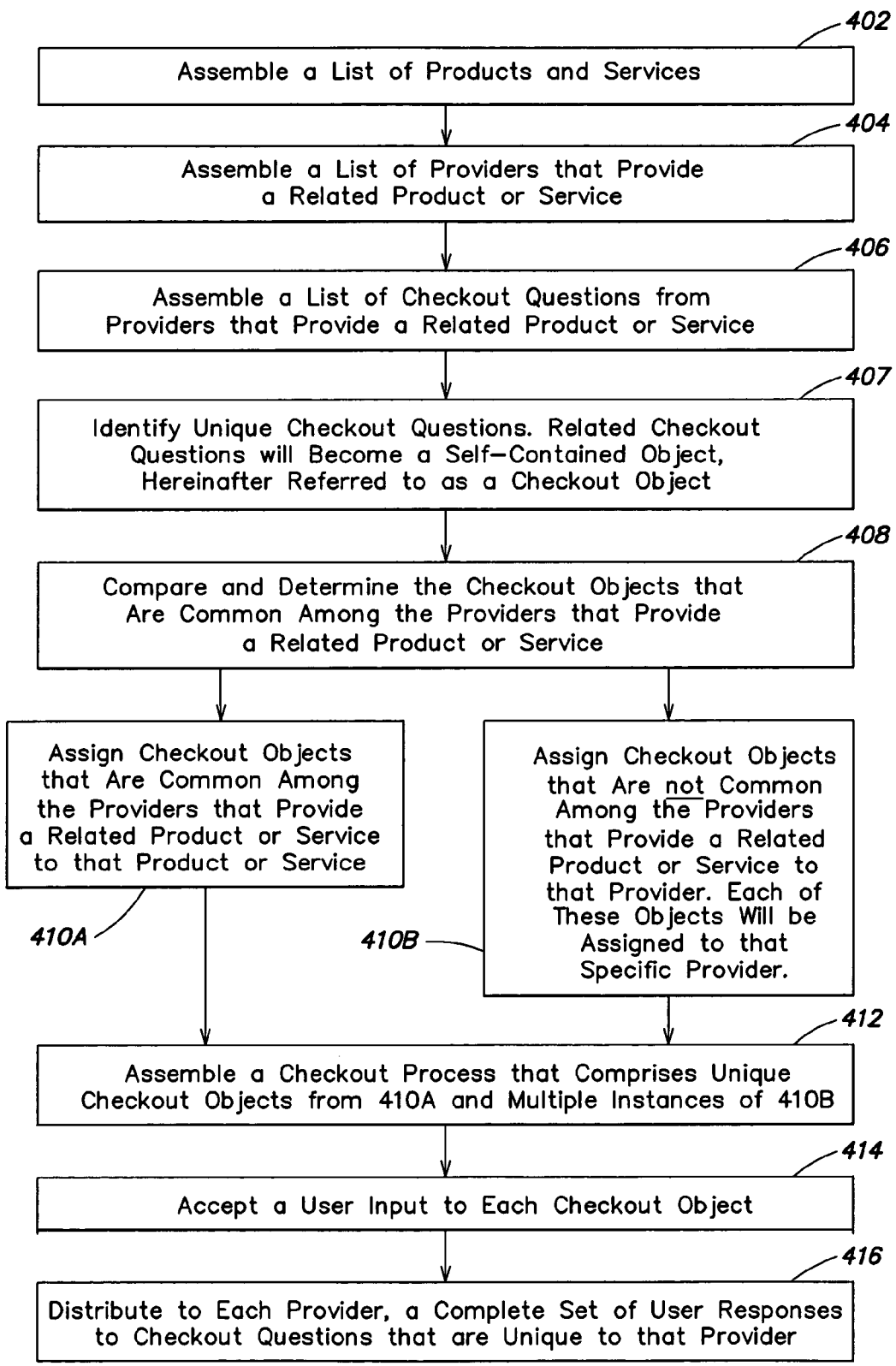
FIG. 4 is a block diagram of steps taken to assemble an online checkout process according to one embodiment of the invention.

FIG. 4 illustrates a block diagram of steps taken to set up a system and method for sharing information among provider systems. Step 402 involves assembling a list of products and services. These products and services can include, for example, services such as Internet service, cable television, and long-distance telephone, and products such as packing supplies and maps. However, it is to be appreciated that this is not an exhaustive list of products and services that may be assembled. Almost any product and/or service may be assembled in step 402.

After a list of products and services has been assembled, a list of providers that provide a related product or service will be assembled in step 404. For example, a list of providers that provide the service Long-Distance Telephone may include AT&T, Sprint and MCI.

Next, in step 406, a list of checkout questions from each of the providers that provide a related product or service will be assembled. Checkout questions from Sprint, for example, may include questions such as "Title," "First Name," "Last Name," "Address," "City," "State," "Zip Code," while checkout questions from MCI may only include questions such as "First Name," "Last Name," "Address," "City," "State," and "Zip Code."

After a list of checkout questions has been compiled from all of the providers, unique checkout questions are identified in step 407. Related checkout questions become a self-contained object, hereinafter referred to as a checkout object. Related is defined to be two or more checkout questions with similar characteristics. For example, the object "name" could comprise the two checkout questions "First Name" and Last Name." Furthermore, once a checkout object is created, it will not be duplicated with the same checkout questions for another provider. In addition, it is an advantage in some embodiments that each provider that asks the same checkout questions will use the same checkout object. Additionally, if an object contains five related checkout questions, but a specific provider wishes to only have three of the five checkout questions displayed, there are parameters written into the code that will allow this functionality.

Continuing with the above example regarding long-distance telephone service, the checkout questions "Title," "First Name," "Last Name," "Address," "City," "State," and "Zip Code" may be grouped into two objects. The first object may be called the "name" object. In this example, the "name" object would include the question fields "Title," "First Name" and "Last Name." The second object may be called the "address" object and may include the question fields "Address," "City," "State" and "Zip Code." These two objects would be created in step 407. An object may comprise as few as one or as many checkout questions as desired.

Checkout objects may be compared to determine those checkout objects that are common among the providers that provide a related or like product or service in step 408.

In step 410A, checkout objects that are common among the providers that provide a related product or service will be assigned to that product or service. A checkout object is common among providers if the checkout object comprises at least one checkout question from each provider of a product or service. In addition, in step 410B, checkout objects that are not common among the providers that provide a related product or service will be assigned to the provider who provided the checkout questions associated with that checkout object. A checkout object is not common among providers if the checkout object does not comprise at least one checkout question from each provider of a product or service.

For example, in one embodiment a checkout object "License" may include the fields "State," "Number" and "Expiration Date." However, if only one out of five providers in a service requested information from a user with regard to the checkout object "License," this checkout object could be considered as not common. The number of providers required to ask a checkout question, related to a checkout object, in order for that checkout object to be considered "common" can vary.

Some checkout objects may be optional. In addition, each provider, within a service, can customize some or all checkout objects to meet their needs. Any questions can be asked in any sequence and in any format, color, font, etc.

Checkout objects are assembled into a checkout process 412 that comprises the unique checkout objects that were common among all of the providers (from step 410A) and the checkout objects that were unique to one or more providers, and that were chosen by the one or more providers (step 410B). For example, the checkout process may include four common checkout objects, each of which is different, from step 410A and three provider checkout objects, again each of which is different, from step 410B. However, there may be multiple instances of the three provider checkout objects. In other words, there may be four total provider checkout objects, of which two are the same. The two checkout objects that are the same would be considered to be two instances of a checkout object. Furthermore, the checkout process may include the steps of determining which objects are to be placed onto what page and in what sequence, among others.

In step 414, a user's input is accepted in response to a checkout object and its associated checkout question. For instance, a user can reply online to a set of questions. In step 416, a complete set of user responses to checkout questions that are unique to a provider, are distributed to that provider.

Because common input interfaces are provided, costs associated with developing and testing customer interfaces are reduced. Also, because information is collected in a reduced number of interfaces, data entry for the user 102 is decreased. Further, because information, products and services associated with a single event are obtained through a single interface (and server site), the user 102 does not have to visit multiple sites to obtain such information, products, and services.

In some embodiments, it is an advantage that questions posed to a user 102 through one or more interfaces are operated on as a group. A particular data field of the group may be designated that may be used to manipulate its associated group data. For instance, to reduce the amount of time required to re-enter user 102 address information, system 301 may store a user's address in database 307 and present a link to the group of data to the user 102, in an interface. By selecting this link, the group of information may be, for example, populated to fields of an ordering screen of a provider 103, or be automatically selected as information that supports a transaction with one or more providers 103.

Figure 5:
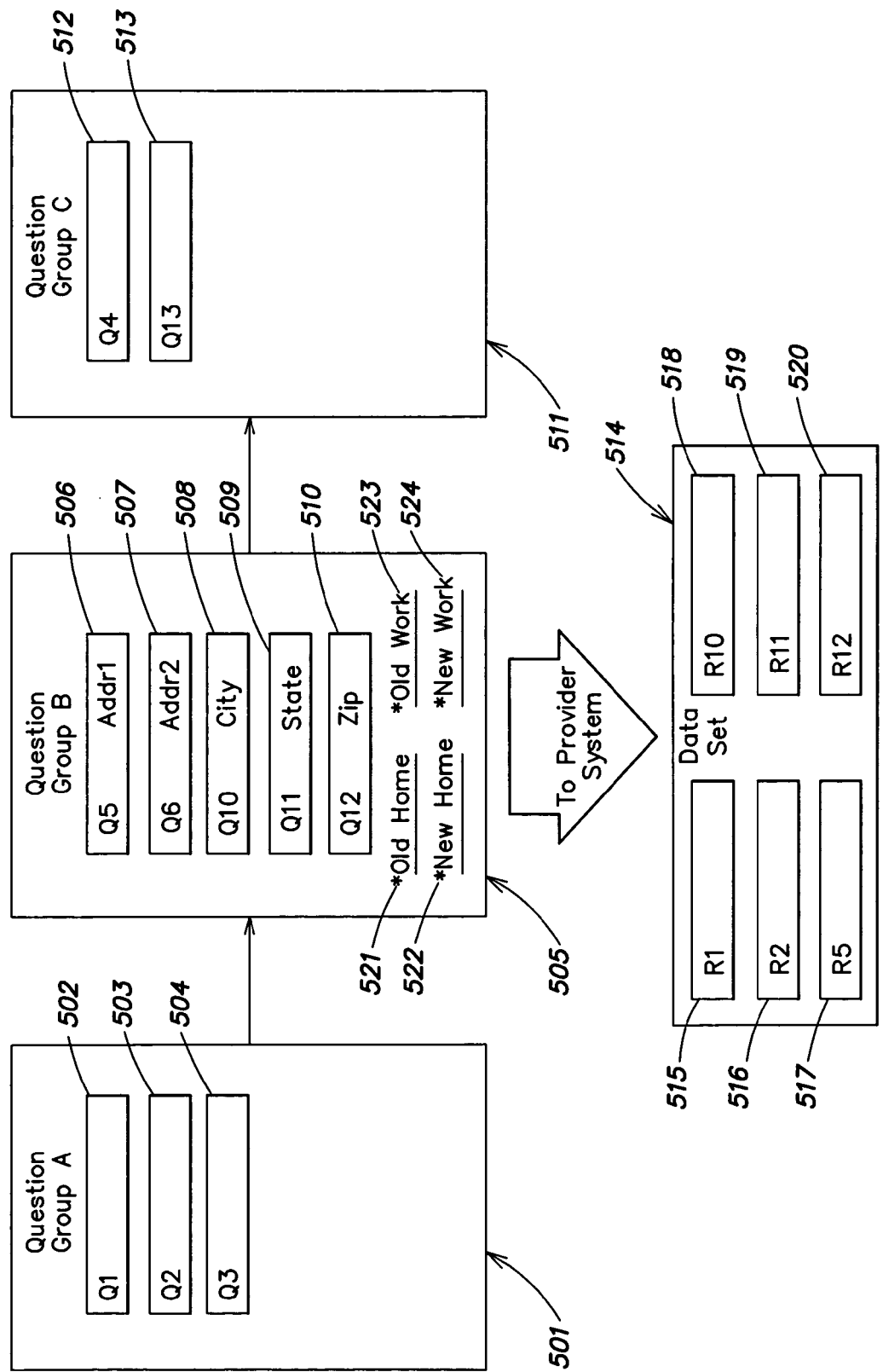
FIG. 5 is a block diagram of a series of objects or question groups of interfaces according to one embodiment of the invention.

FIG. 5 shows a number of question groups or objects 501, 505, 511 that may be presented to a user 102 in one or more interfaces. For example, object A (item 501) may include questions Q1-Q3 (items 502-504). These questions may be grouped as a set and related to a user 102 by a key field which may be one or more of question answers associated with the questions posed. For example, considering object B (item 505) that includes a number of question fields Q5-Q12 (items 506-510) related to address information, answers to the questions Q5-Q12 may be displayed to the user 102 as a link (items 521-524) to the group of information stored in database 307. Thus, for example, if the user 102 interface prompts for the use of an address, the user 102 may select the link identifying the data set, and that information may be entered automatically in the question fields. Any of the above-disclosed objects may contain service-specific questions, provider level questions, marketing level questions, or any combination thereof. It is to be appreciated that modifying the contents or questions posed to a user 102 at the object level is within ordinary skill of one in the art.

Server 301 gathers responses to the questions and provides these in turn to one or more provider systems 103, as necessary. In particular, a data set 514 provided to one or more server systems 103 may include only the subset of information necessary to complete the transaction. For example, set 514 includes responses R1, R2, R5, R10, R11, and R12 (items 515-520, respectively) to questions Q1, Q2, Q5, Q10, Q11, and Q12. In this manner, the number of interfaces necessary for collecting data are standardized and reduced in number.

Figure 6:
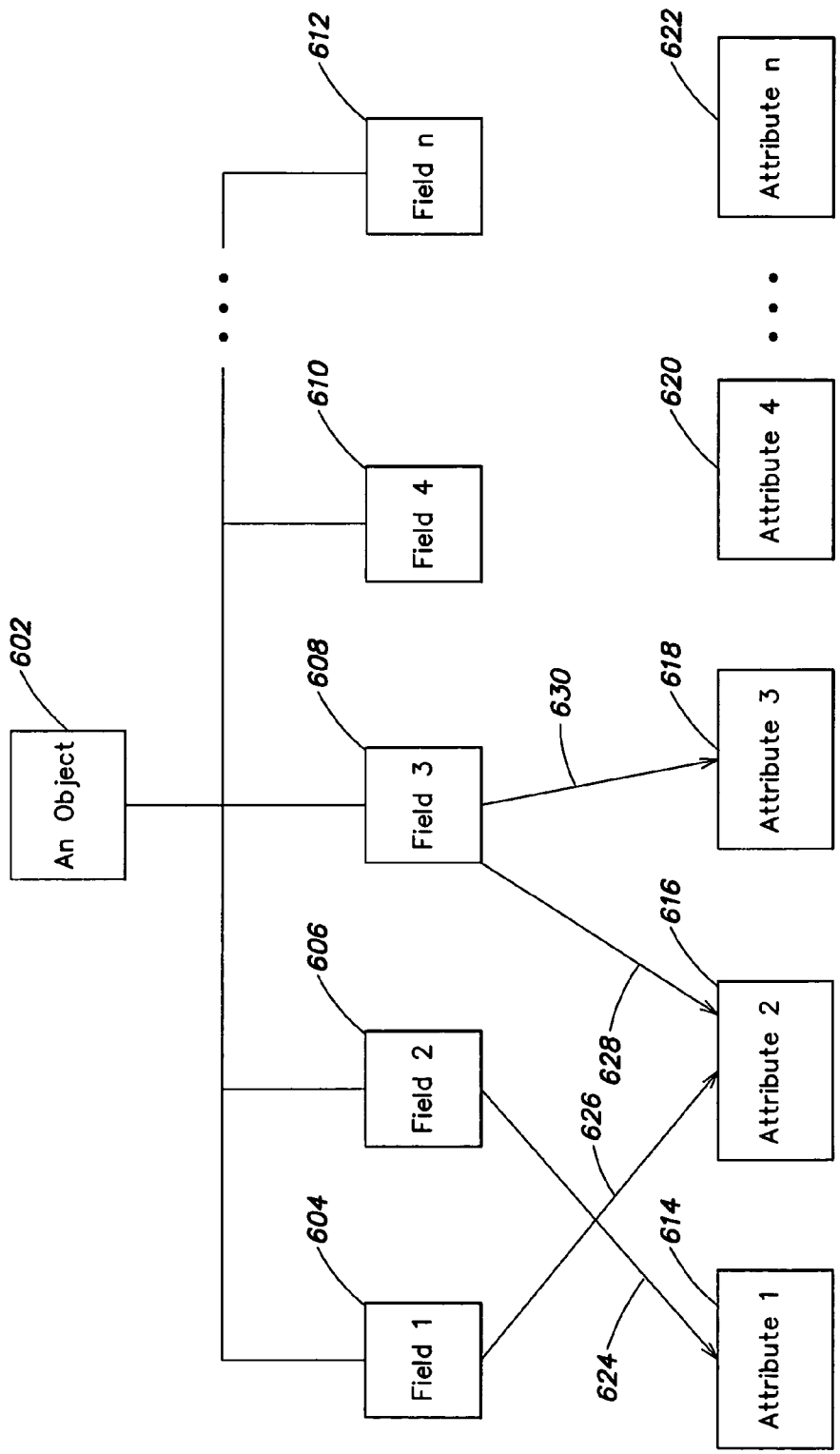
FIG. 6 is a block diagram of an object with several fields and attributes according to one embodiment of the invention.

Furthermore, information contained within each field (a field is either a single question or an answer), or a part of a field, can be further assigned individual attributes. Attributes contain information regarding how each field will be displayed. For example, referring to FIG. 6, an object 602 may include the fields 604-612. Each field can comprise one or more of its own attributes as shown by arrows 624, 626, 628, and 630. In this example, field 1 604 is assigned attribute 2 616, field 2 606 is assigned attribute 1 614, and field 3 608 is assigned attributes 2 616 and 3 630. It is to be appreciated that fields can be assigned any number of attributes, and that attributes can be assigned more than one field. Attributes can include, but are not limited to, color, font, font size, bold, italics, underline, drop-down menu, radio buttons, and text. It should be appreciated that the invention is not limited to any particular method for modifying an attribute.

According to one aspect of the invention, a server 301 is provided that functions as a guide to movers. More particularly, this guide assists users 102 (e.g., people who are about to move, are in the process of moving or who have moved) with various aspects related to moving. In one aspect, the system 301 organizes multiple providers 103 related to a single event, such as moving. These providers 103 in turn may provide services and/or products.

Figure 7:
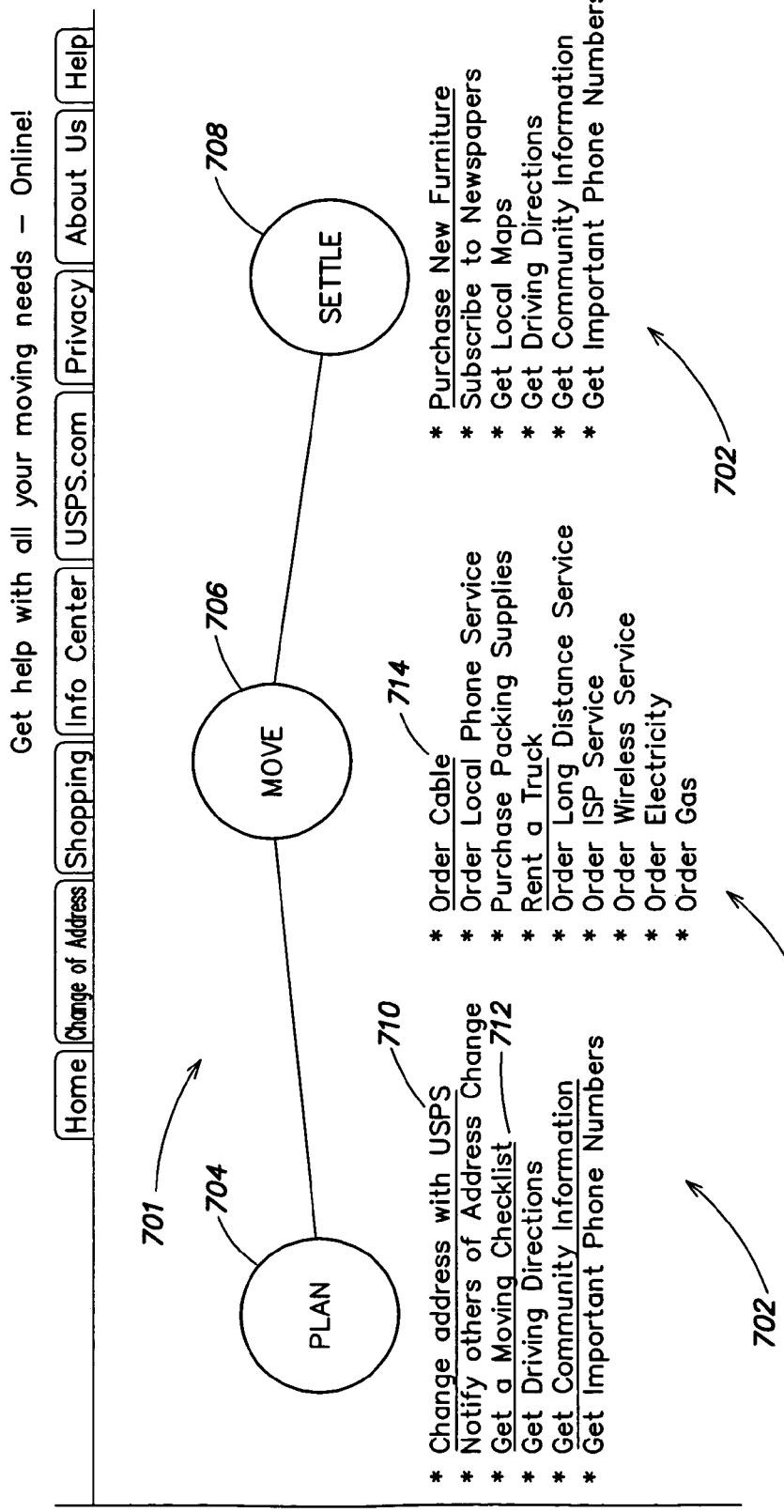
FIG. 7 is a index or home page presented in accordance with one embodiment of the invention.

For example, FIG. 7 shows an example index or home page 701 for the to-be-released world wide web site MoversGuide.com, developed and operated by the assignee herein. The user 102 may be presented many options or links 702 under the headings Plan 704, Move 706, and Settle 708.

The first heading, "Plan" 704 contains links 702 to various sites that assist a user 102 in preparation for an upcoming move. Links 702 under the heading "Plan" may include "Notifying the United States Postal Service about change of address," "Find local government resources," "Notifying friends and family about change of address," "Obtaining and maintaining a moving checklist and timeline," "Obtaining maps and driving directions," "Purchasing moving supplies," "Rent storage space," "Obtaining community information," "Obtaining tips that deal with moving with children," "Obtaining tips that deal with practical packing," and "Obtaining important phone numbers" such as police, fire, etc. However, it is to be appreciated that the links under the heading "Plan" are not limited to the above products and services, and that many more products and services can be added that are within ordinary skill of one in the art.

The second heading entitled "Move" 706 contains links 702 to sites that are important for a user 102 to access at or close to the time of moving. Links 702 under the heading "Move" may include "Renting a truck," "Connecting and disconnecting cable," "Connecting and disconnecting internet service provider," "Connecting and disconnecting local phone service," "Connecting and disconnecting long distance phone service," "Connecting and disconnecting wireless phone service," "Canceling newspaper subscription," "Obtaining tips that deal with moving with pets," and "Connecting and disconnecting utilities" such as gas, electricity, etc. However, it is to be appreciated that the links under the heading "Move" are not limited to the above products and services, and that many more products and services can be added that are within ordinary skill of one in the art.

The third heading, "Settle" 708, contains links 702 to sites that assist a user 102 in settling at the users new location. Links 702 under the heading "Settle" may include "Purchasing furniture," "Subscribing to newspaper subscription," "Obtaining local maps," "Obtaining pet service," and "Obtaining banking service." However, it is to be appreciated that the links under the heading "Settle" are not limited to the above products and services, and that many more products and services can be added that are within ordinary skill of one in the art.

It should be clear that many of the links 702 under the headings "Plan," "Move," and "Settle" are further examples of products and services that may be assembled as discussed before in step 402, FIG. 4.

A detailed example follows below. Referring back to FIG. 7, if the user 102 selects the option "Change address with USPS" 710, a new page 801 appears such as the page disclosed in FIG. 8. FIG. 8 shows several examples of service specific questions. Because there is only one United States Postal Service, each of the questions asked would be considered to be service-specific. An example with multiple providers will be further explored below. A user 102 will answer each of the required questions 802, such as those illustrated in FIG. 8. After the user 102 completes the questions 802 and selects the "Continue" button 804, a validation test will be performed on the data to ensure that the user 102 has not entered erroneous data or that the user 102 has not left an answer to a required question 802 blank.

Typical information provided by a user 102 to a provider 103 that may be stored by server 301 includes identification information (e.g., name, title, etc.), address information including old address and new address, credit card information, email addresses, shipping information, employment information, financial information, and contact information. However, it is to be appreciated that the type of information requested from a user is not limited to the above, and that additional user information can be added that is within ordinary skill of one in the art.

Server 301 may save information, or specifically not save or share information that should not be shared with other providers 103, such as, for example, credit card information. This information may be saved based on user 102 preferences, for example.

Figure 9:
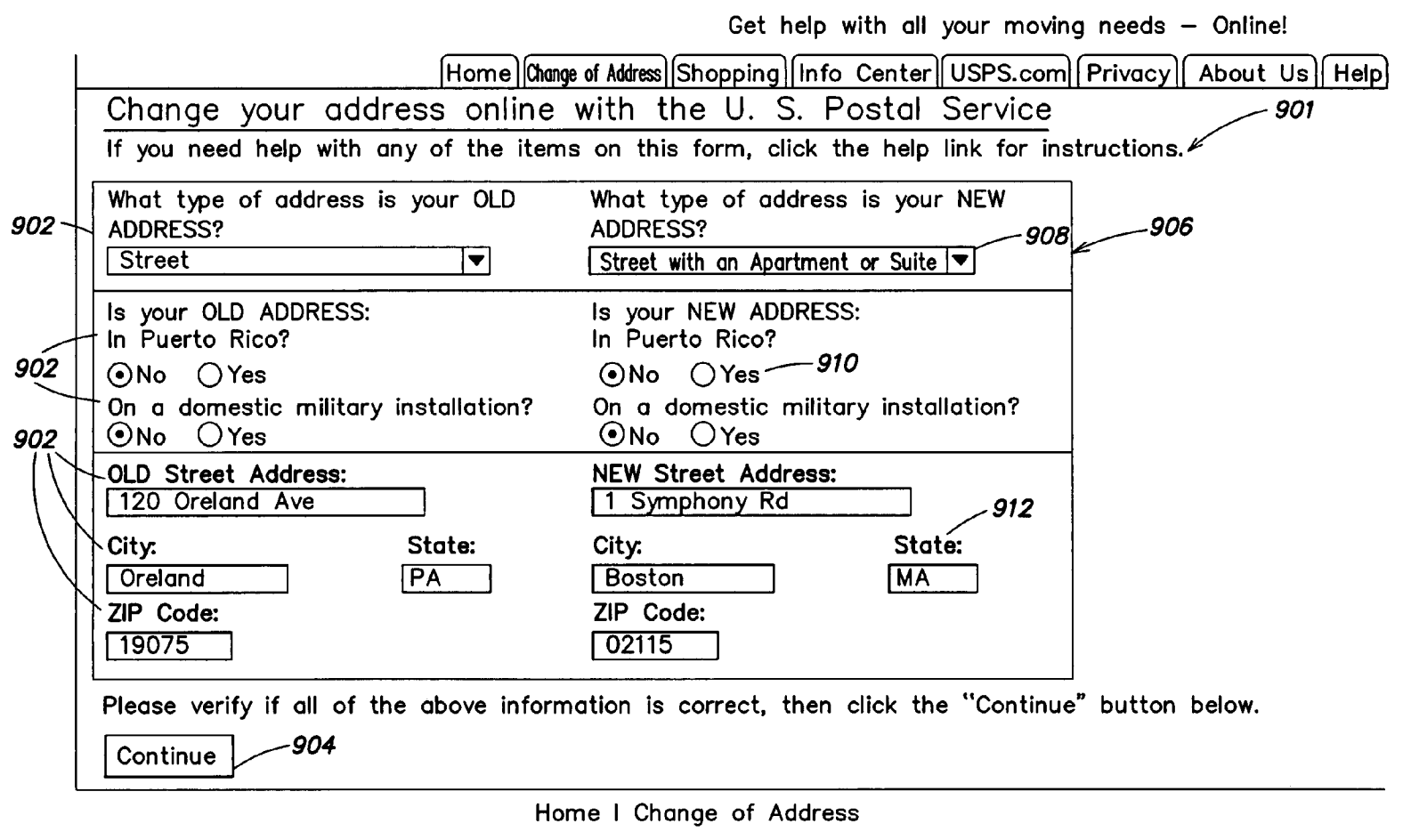

After the data has successfully passed the validation test, a new page 901 may be shown such as the page disclosed in FIG. 9. Further service specific questions are posed to the user 102 as shown in FIG. 9. FIG. 9 also illustrates an example of an object. In this example, the object could be termed the "address" object 906. The object "address" comprises the questions "OLD Street Address," "City," "State," "ZIP Code," "NEW Street Address," among others. As discussed before, the provider, United States Postal Service in this example, selects the questions posed to the user 102. Questions with like characteristics are then grouped into objects or question groups. The provider can then further select the field attributes within each object or question group. There are many types of attributes that can be applied to a single field or a whole object, examples of which are illustrated in FIG. 9. For instance, the drop-down menu 908 under the question "What type of address is your NEW ADDRESS?", the "yes/no" radio buttons 910 under the question "Is your NEW ADDRESS: In Puerto Rico?", and the bolding 912 under the state field are just a few among many types of attributes that can be selected.

After the data has successfully passed the validation test again, a new page 1001 may be shown such as the page disclosed in FIG. 10 that offers the user 102 a chance to verify the data entered for accuracy. After the user selects the "Continuation" button 1004, the transaction is complete. It can be appreciated that the various pages, such as those illustrated in FIGS. 8, 9, and 10, can be modified extensively using a programming language such as Java, and/or a web based language such as HTML or XML. For example, pages could be added, deleted, or rearranged, information contained within objects could be added or deleted, attributes could be modified, and many other changes could be made that are known to those of skill in the art.

Referring back to FIG. 5, in another example based on MoversGuide.com, a user 102 could select the link "Get a Moving Checklist" 712 under the heading "Plan" 704. A new page 1101 may be shown such as the page disclosed in FIG. 11. This page 1101 will allow a user 102 to create a checklist of things to do before, during, and after a move. In yet another example, FIG. 12 discloses a page 1201 containing community information. This page can also be linked to from the home page 701 as disclosed in FIG. 7.

Referring again back to FIG. 7, in yet another example based on MoversGuide.com, a user 102 could select the link "Order Cable" 714 under the heading "Move" 706. A new page 1301 may be shown such as the page disclosed in FIG. 13. In this example a user 102 has chosen to obtain cable service. The user 102 is prompted with a service specific question 1302 regarding cable. After the user 102 selects the "Continuation" button 1304, a new page 1401 will appear such as the page disclosed in FIG. 14. Again, The user 102 is prompted with a service specific question 1402 regarding cable. After the user 102 selects the "Continuation" button 1404 and the data passes the validation test, a new page 1501 appears such as the page disclosed in FIG. 15.

FIG. 15 illustrates an example of provider-specific questions 1506, 1508 posed to a user 102. As discussed before, provider-specific questions are customized to meet the needs of each provider 103. Here, for example, both Provider 1 1510 and Provider 2 1512 ask the same questions, but that is not always the case. After the user 102 selects Provider 1 1510 or Provider 2 1512 or both (the user can select both, in this case the next page illustrates information regarding both providers) and then further selects the "Continuation" button 1504, a new page 1601 appears such as the page disclosed in FIG. 16. FIG. 16 illustrates four provider level options 1602 from which a user 102 can select. Here again, a user 102, selects an option 1602 that results in the appearance of another page. This process continues until the user 102 completes the transaction or aborts the process. Again, it is to be appreciated that the various pages can be modified extensively. For example, pages could be added, deleted, or rearranged, information contained within objects could be added or deleted, attributes could be modified, and many other changes could be made that is within ordinary skill of one in the art.

Due to the object-oriented approach, a user will only have to address one set of common questions for multiple providers. Flexibility in assigning attributes at the object and field level also provides another advantage to the user. In one aspect of the invention, all user information and provider information is stored in a database, and this provides the user and programs the ability to easily access both types of information. In another embodiment, the server of which the database is housed in has Secure Socket Layer Encryption to protect the information.

As discussed above, one aspect of the invention includes providing the capability of a provider system to check out information to support a transaction. Such information may include customer-related information for a customer involved in the transaction. This information may be stored, for example, in one or more checkout objects. In one aspect of the invention, information stored in multiple checkout objects may be considered in a single object in a more unstructured manner. One advantage of consolidation is that multiple checkout objects may be operated on as a whole, and the programming that uses such an object is simplified as a result. Various aspects of the invention may include objects using a structured approach, unstructured, or a combination of approaches as discussed in the examples below.

Figure 17:
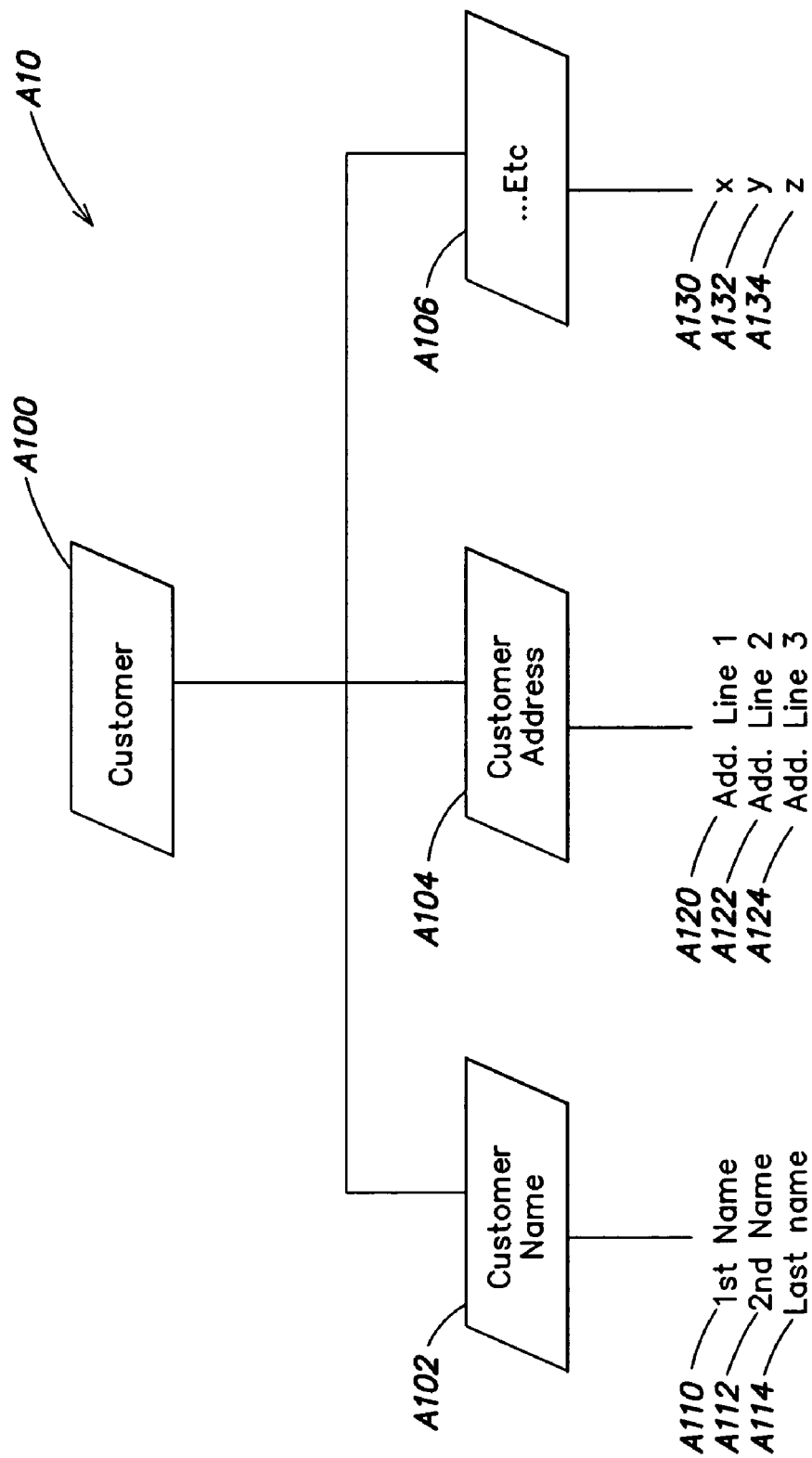
FIG. 17 shows a structured system according to one embodiment of the invention.

FIG. 17 illustrates a structured system A10 for sharing information among provider systems according to one embodiment of the invention. A customer A100 is associated with a customer name A102, the customer name A102 comprising a first name A110, a middle name A112 and a last name A114. The customer A100 may also be associated with a customer address A104. Address A104 may comprise a first address line A120, a second address line A122 and a third address line A124 which may be a zip code or other address designation. Customer A100 may be associated with numerous other data and characteristics A106 which may in turn include data such as A130, A132 and A134.

According to one embodiment of the invention, a paradigm of the structured system A10 for sharing information among provider systems may entail creation of separate data structures to accommodate each type of customer information, such as name A102, address A104 and other information A106.

In the structured approach shown in FIG. 17, information associated with customer A100, (e.g., A102, A104 and A106) may be considered discrete check-out objects. Each checkout object may be created individually to suit the needs of any service providers using the check-out objects. For example, if a service provider only requests a customers name, then the service provider will access and use the information within the customer name check-out object A102. Service providers may require more than one check-out object, and service providers may also sometimes require information which is unique to that individual service provider such as information specifically relating to the type of service provided by that service provider. In many instances, the check-out objects need to be created independently which requires significant effort and time on the part of the systems programmers. Some mistakes may also be made in the structured approach of FIG.

17 if a service provider is provided with the incorrect checkout object contrary to the needs or request of the service provider.

Figure 18:
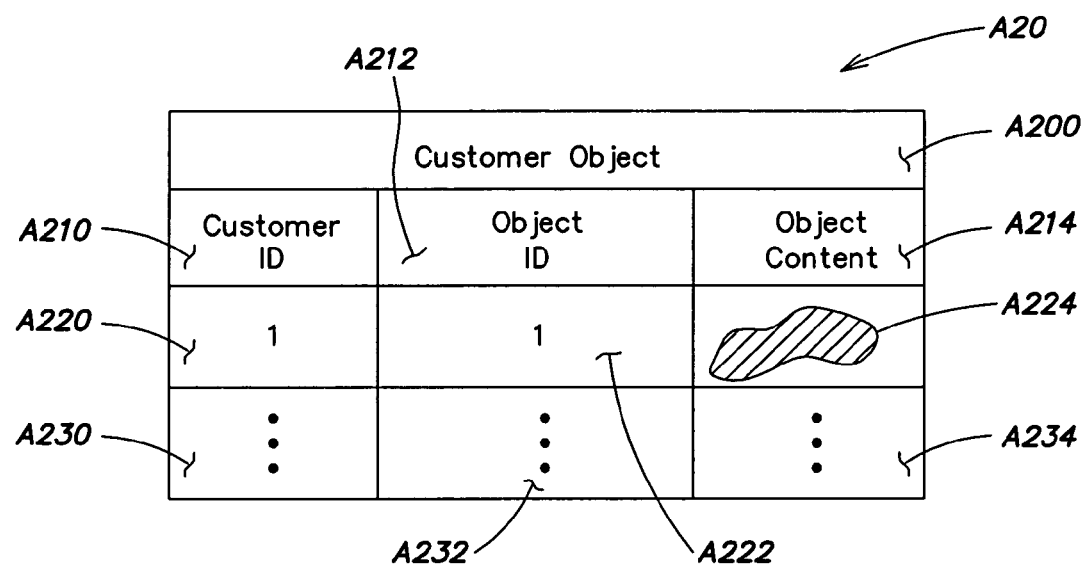
FIG. 18 shows an unstructured system according to one embodiment of the invention.

One aspect of the present invention relates to providing customer information to a plurality of service providers in a more unified and sometimes unstructured manner. FIG. 18 illustrates an unstructured system or data construct A20 accordingly to this concept. A customer object A200 comprises a plurality of types of check-out objects which can include, for example, a customer ID A210, an object ID A212 and an object content A214. Analogies between the structured approach of FIG. 17 and the unstructured approach of FIG. 18 should be made carefully, as various embodiments of the unstructured approach can share some similarities with the structured approach but differ in other ways. The exact nature of an individual embodiment of an unstructured approach depends upon the desired result and the application at hand.

In the example illustrated in FIG. 18, a column labeled as customer ID A210 identifies customers by a number such as in blocks A220 and A230, etc. A column identified as object ID A212 is also identified by numbers such as in block A222, A232 etc. As an example, customer ID #1 in block A220 may represent a given customer having several object IDs under column A212 so that a customer identified as customer #1 may have an object ID #1 in block A222 which represents the customers name and another object in block A232 which represents customer #1's address, etc. The actual content of the name object in block A222 could be placed in an object content block such as A224 and may comprise any type of data such as numbers, characters, text, images or audio information, or combination thereof, as is required or convenient for the application. In one embodiment, an object content block such as A224 contains not only the actual content, but an indicator (such as a metatag or metalabel) that identifies the content. For example, object content block A224 may contain the text "John Smith," as well as an indicator defining the content as a customer name. Such an indicator may be provided in any suitable manner. In one embodiment, the tag is encoded in the extensible mark-up language (XML). The use of indicators such as metatags is further described with reference to FIG. 19.

In some implementations, an unstructured approach such as shown by A220 may provide the ability for service providers to parse through the customer object A200 and selectively read, load, and/or sense the information contained therein. In some aspects, as will be described in more detail below, a plurality of distinct service providers may link to the customer object A200 and read various object ID's A212 for various customer ID's A210 based on tags or indicators embedded, within the customer object A200.

Figure 19:
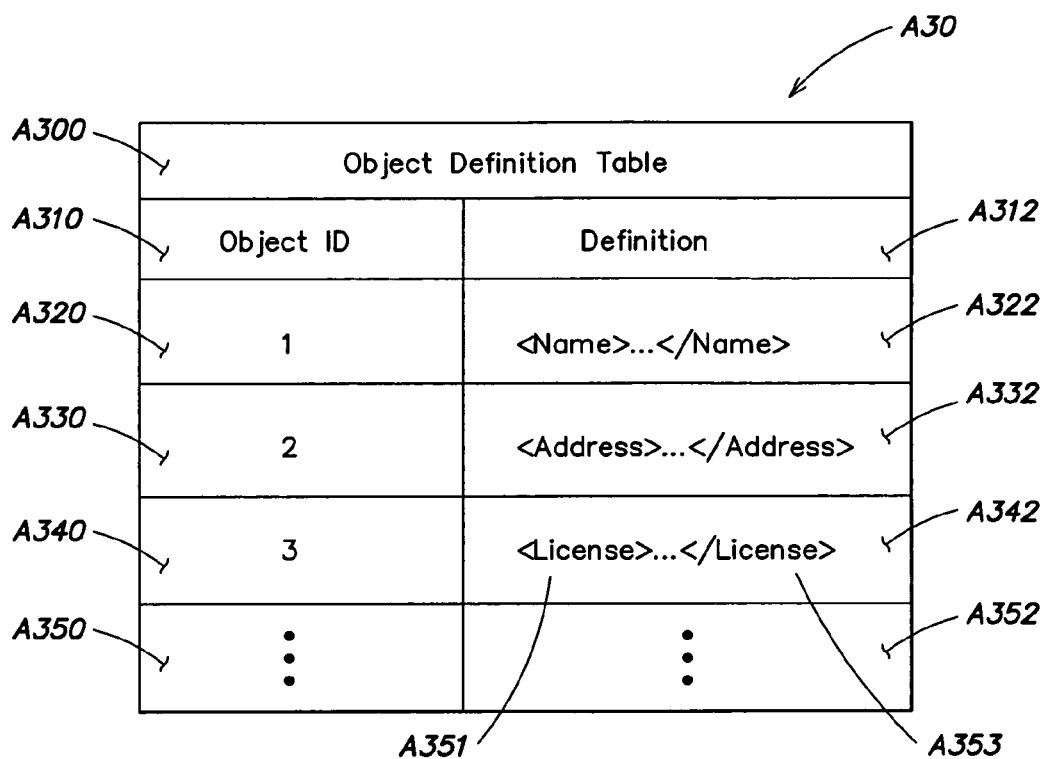
FIG. 19 shows an object table according to one embodiment of the invention.

To facilitate the concepts discussed above, information may be arranged in definition tables such as shown in FIG. 19 and labeled as A30. An exemplary object definition table A300 may comprise two primary fields: an object ID field A310 and a corresponding definition field A312. Object ID A310 may be associated with a list of objects 1, 2, 3, etc., indicated in FIG. 19 as A320, A330, A340, A350. These objects may be defined under the definition A312 by their characteristic or identifying features. For example, A322 is a definition of a name and may correspond to an object ID of 1. A332 may correspond to an address and have an object ID of 2. A342 may correspond to a drivers license number and correspond to an object ID # of 3, etc.

Metatags or metalabels can be used to delineate the beginning and the end of a field such as a definition field. In the example of FIG. 19, the customer license definition A342 contains data which begins with a metatag A351 having the form of [license] and ending with a metatag A353 having the form of [\license]. Of course these forms for metatags A351 and A353 are not limiting and other forms may be employed as required. In some embodiments, XML is used to encode metatags identifying information contained therein.

FIG. 20 illustrates a data construct A40 to facilitate service providers checking out and requesting various objects containing customer information. A service provider checkout table A400 may comprise a list of service provider IDs A410 and corresponding objects A412.

In the example of FIG. 20, a service provider #1 indicated by A420 requests a plurality of objects (1, 2, 5 and 7) indicated by A422. Another service provider indicated as A430 requests a different plurality objects (1 and 3) indicated by A432. Yet another service provider A440 requests at least an object A442, etc. It should be noted that more than one service provider may request similar information. As shown in the previous example, service providers #1 and #2 both desire object #1 in the object column. Also, service providers #3 and #1 both request object #2 in the object column.

FIG. 21 illustrates an exemplary system or data construct A50 for presenting customer check-out information and data objects to various service providers requiring this information. An unstructured table referred to as a customer check-out table A500 comprises a plurality of fields. For example, a customer ID field A510 identifying the customer with a number such as 1001, 1002, etc. A second field is for a service provider ID A512 which may identify various service providers such as 1, 2, 3, etc. Yet another field comprises object ID information A514. Object ID information may also be indicated numerically as described earlier. In addition, a content field A516 may be used to contain the content of the object defined in the object ID.

Looking at the table A50 as a whole, we see that various service providers may require, and therefore, need to checkout information associated with particular customers. In the example of FIG. 21, service provider #1 receives from customer ID #1001 objects identified by 1, 2, 5, 7 and U. The field A527 indicated by (u) illustrates a unique item needed by this service provider. Such unique items may, in some instances, need to be individually programmed by system programmers or registered by the service providers or the users (e.g., customer). The example of FIG. 21 also shows service provider #2 requiring from customer ID #1001 data fields 1 and 3 as described previously. Content field A512 may itself comprise a number of different or related data subfields. Note that block A526 is dedicated to the customer name, but that it may also contain the customer name, title, first name and last name. In one embodiment, the format for such a content block is [Name] [title] . . . [\title] [Fname] . . . [\Fname] [Lname] . . . [\Lname] [\Name]. In this way, metatags for the customers title, first name (Fname) and last name (Lname) may be entered.

The unstructured approach described above can in some embodiments may allow service providers to search through a data construct containing customer information with individual parts of the customer information delineated and identified with tags or metatags. The use of the XML language may be employed in some instances according to the concepts described herein to allow for streamlined retrieval of customer information by a plurality of service providers. A service provider may thus parse through the tables containing the metatags and their associated data to selectively read or pull out that customer information which they require and as identified by the tags or metatags. In some applications, a large reduction in the required programming time and a corresponding reduction in cost and human error may be achieved by using the unstructured approach described herein. In other embodiments, the unstructured, approach may still provide all the information which was previously contained in structured object constructs without any loss of functionality.

In yet other aspects, the object definition table and the service provider check-out table may be pushed or selectively delivered to customers. Thus a process may be implemented whereby the object definition table and the service provider check-out table are pushed to partners and customers, after which a customer selects the services provided by various service providers (for example, utilities, newspapers, etc.) and provide any response objects from the customer that are needed in the check-out process. A customer may then check-out by having all of the response objects filling the customer check-out table and corresponding to that customer ID #. In this way, a service provider may find all of the required information according to the customer's request and entry into the customer check-out table.

Additionally, post-processing of the entered data is possible. The customer check-out table or all parts thereof may be placed into a format as specified by the service providers. The service providers may dynamically specify the format in which they wish to receive the customer check-out information. A process whereby service providers establish an account with an entity providing a system and process for linking the service providers to the customers is possible. A full service provider establishes an account number or a service provider ID # and an associated list of data objects which are required by this service provider in order to provide their service to the customers. The entity maintaining the system and administering the process may thus assist both the service providers and the customers in this regard.

Some applications benefit from the fact that a unique service provider data request can now be accommodated in the unstructured approach by merely adding a line and the requisite metatags to solicit this unique information rather than requiring a new program customized to solicit the unique information.

Additional detailed information regarding various aspects of the invention appear in Appendices I and II, which are incorporated herein in their entirety and form an integral part of this specification. Included in Appendix I is a detailed example of a newspaper subscription service. Also, included in Appendix I are printouts of pages a user would encounter as the user navigates through a web site designed according to one embodiment of the present invention. Specifically shown are the pages the user would encounter upon considering ordering a newspaper subscription from among the multiple service providers which provide newspaper service. It should be appreciated that the user need not complete any question more than once even if ordering newspaper service from more than one provider. Included in Appendix II is a logical data model of MoversGuide.com, the web site produced by the assignee herein according to one aspect of the present invention.

While several embodiments of a system and method for sharing information among provider systems of the invention have been described and illustrated herein, those of ordinary skill in the art may readily envision a variety of other structures for performing the functions and/or obtaining the results or advantages described herein, and each of such variations or modifications is deemed to be within the scope of the present invention. In addition, those skilled in the art may readily appreciate that all parameters and configurations described herein are meant to be exemplary and that actual parameters and configurations will depend upon specific applications for which the teachings of the present invention are used. Those skilled in the art may also recognize, or be able to ascertain using no more than routine experimentation, equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, structure, combination of structures, system, and/or method described herein. In addition, any combination of two or more such features, structures, combination of structures, systems, and/or methods, provided that such features, systems, structures, combination of structures, and/or methods are not mutually inconsistent, is included within the scope of the present invention. In the claims, all transitional phrases or phrases of inclusion, such as "comprising," "including," "carrying," "having," "containing," and the like are to be understood to be open-ended, i.e. to mean "including but not limited to."

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system for sharing customer data with a plurality of service providers, comprising at least one computer processor device configured to implement:

a server process operable to receive a plurality of information items from at least one customer, wherein the plurality of information items are organized into at least two fields of information items;

a database operable to store the information items received from the at least one customer in a plurality of customer data objects, each customer data object including one of the fields of the information and tags indicative of the field, the plurality of customer data objects comprising a first customer data object including a first field of the information and a second customer data object including a second field of the information;

a tag parser that parses the tags to determine the field of the information stored in each of the customer data objects; and an information manager operable to provide the first customer data object to a first of the plurality of service providers and the second customer data object to a second of the plurality of service providers based upon reference to a table of fields required by at least the first and the second service providers to allow the plurality of service providers to provide services to the at least one customer, wherein the first customer data object is in the table of required fields associated with the first service provider and the second customer data object is in the table of required fields associated with the second service provider.

2. The system of claim 1, wherein the data parser is an XML parser and the tags are XML tags.

3. The system of claim 1, wherein the database is a relational database.

4. The system of claim 1, wherein the data objects are stored in an unstructured format.

5. The system of claim 1, wherein the information manager is further operable to place the customer data objects into a check-out data construct comprising at least information identifying the customer, information identifying a service provider, customer data corresponding to the data objects and tag information identifying the customer data.

6. The system of claim 1, wherein the information manager provides data object content to the plurality of service providers by sending the data object content to the plurality of service providers.

7. The system of claim 1, wherein the server process is further operable to receive a plurality of fields of information from the at least one customer, and wherein the database is further operable to store each field of information in one of the plurality of customer data objects.

8. The system of claim 1, wherein the server process is further operable to change the format of the first customer data object based upon a format specified by the first of the plurality of service providers and to change the format of the second customer data object based upon a format specified by the second of the plurality of service providers.

9. The system of claim 1, wherein the server process is further operable to receive a plurality of fields of information from the at least one customer, and wherein the database is further operable to store each field of information in one of the plurality of customer data objects.

* * * * *